(12) United States Patent
Charipadi et al.

(10) Patent No.: US 11,019,574 B2
(45) Date of Patent: May 25, 2021

(54) TRANSMIT POWER CONTROL IN A C-RAN

(71) Applicant: CommScope Technologies LLC, Hickory, NC (US)

(72) Inventors: Gopikrishna Charipadi, Bangalore (IN); Stuart D. Sandberg, Acton, MA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/786,872

(22) Filed: Feb. 10, 2020

(65) Prior Publication Data

US 2020/0280927 A1 Sep. 3, 2020

Related U.S. Application Data

(60) Provisional application No. 62/812,432, filed on Mar. 1, 2019, provisional application No. 62/865,804, filed on Jun. 24, 2019.

(51) Int. Cl.
*H04W 52/14* (2009.01)
*H04W 52/24* (2009.01)
*H04W 52/22* (2009.01)

(52) U.S. Cl.
CPC ....... *H04W 52/146* (2013.01); *H04W 52/221* (2013.01); *H04W 52/241* (2013.01)

(58) Field of Classification Search
CPC . H04W 52/146; H04W 52/241; H04W 52/44; H04W 72/042; H04W 72/1284; H04W 84/042

(Continued)

(56) References Cited

U.S. PATENT DOCUMENTS

2012/0224553 A1* 9/2012 Kim ............... H04W 52/54
370/329
2013/0115998 A1* 5/2013 Lamm ............. H04W 52/58
455/522

(Continued)

FOREIGN PATENT DOCUMENTS

KR 20180098667 A 9/2018
WO 2018027231 A1 2/2018
WO 2018203610 A1 11/2018

OTHER PUBLICATIONS

International Searching Authority, "International Search Report and Written Opinion from PCT Application No. PCT/US2020/017548", from Foreign Counterpart to U.S. Appl. No. 16/786,872, dated Jun. 2, 2020, pp. 1 through 10, Published: WO.

*Primary Examiner* — Tan H Trinh
(74) *Attorney, Agent, or Firm* — Fogg & Powers LLC

(57) ABSTRACT

A communication system is provided. The communication system includes at least one radio point, each configured to exchange radio frequency (RF) signals with a user equipment (UE) at a site. The communication system also includes a controller communicatively coupled to the at least one radio point. The controller is configured to determine a transmit power control (TPC) command for the UE based on a signal to interference plus noise (SINK) for the UE. The controller is also configured to determine a count (N) of consecutive uplink transmissions, from the UE, meeting at least one criteria. The controller is also configured to determine a modified TPC command for the UE based on the count (N) and the TPC command.

41 Claims, 6 Drawing Sheets

(58) Field of Classification Search
USPC .................................. 455/69, 522; 370/329
See application file for complete search history.

(56) References Cited

U.S. PATENT DOCUMENTS

| | | | |
|---|---|---|---|
| 2014/0241273 A1* | 8/2014 | Kim ..................... | H04L 5/0053 |
| | | | 370/329 |
| 2014/0369312 A1* | 12/2014 | Yang ................... | H04W 52/221 |
| | | | 370/331 |
| 2016/0050057 A1* | 2/2016 | Kim ..................... | H04J 11/0053 |
| | | | 370/329 |
| 2016/0249250 A1* | 8/2016 | Kim ..................... | H04L 5/0073 |
| 2017/0006553 A1* | 1/2017 | Xu ....................... | H04W 52/44 |
| 2017/0273027 A1* | 9/2017 | Kim ..................... | H04W 52/48 |
| 2017/0366377 A1* | 12/2017 | Papasakellariou .... | H04L 27/261 |
| 2018/0048498 A1* | 2/2018 | Stern-Berkowitz .......................... |
| | | | H04W 16/14 |
| 2018/0242265 A1* | 8/2018 | Larsson ................ | H04W 52/60 |
| 2019/0215781 A1* | 7/2019 | Jeon ..................... | H04W 76/32 |
| 2019/0230597 A1* | 7/2019 | Akkarakaran ....... | H04W 52/228 |
| 2019/0357232 A1* | 11/2019 | Raghothaman ....... | H04L 5/0037 |
| 2019/0363843 A1* | 11/2019 | Gordaychik .......... | H04L 1/0013 |

* cited by examiner

TRANSMIT POWER CONTROL IN A C-RAN

CROSS-REFERENCE TO RELATED APPLICATIONS

This application claims the benefit of U.S. Provisional Patent Application Ser. No. 62/865,804 filed on Jun. 24, 2019, entitled "TRANSMIT POWER CONTROL IN A C-RAN"; and U.S. Provisional Patent Application Ser. No. 62/812,432 filed on Mar. 1, 2019, entitled "TRANSMIT POWER CONTROL IN A C-RAN", the entirety of both of which are incorporated herein by reference.

BACKGROUND

A centralized radio access network (C-RAN) is one way to implement base station functionality. Typically, for each cell implemented by a C-RAN, a single baseband unit (BBU) interacts with multiple remote units (also referred to here as "radio points" or "RPs") in order to provide wireless service to various items of user equipment (UEs).

A C-RAN may perform transmit power control to control the transmit power of UEs connected to the C-RAN. However, conventional techniques for transmit power control typically do not account for gains made from interference rejection combining (IRC) performed at the C-RAN. Furthermore, errors/inaccuracies may be introduced while estimating signal to noise plus interference (SINR) used in transmit power control in a C-RAN, whether the UE(s) are transmitting in the presence of interference or not. Accordingly, the present systems and methods may describe transmit power control in a C-RAN.

SUMMARY

A communication system is provided. The communication system includes at least one radio point, each configured to exchange radio frequency (RF) signals with a user equipment (UE) at a site. The communication system also includes a controller communicatively coupled to the at least one radio point. The controller is configured to determine a transmit power control (TPC) command for the UE based on a signal to interference plus noise (SINR) for the UE. The controller is also configured to determine a count (N) of consecutive uplink transmissions, from the UE, meeting at least one criteria. The controller is also configured to determine a modified TPC command for the UE based on the count (N) and the TPC command.

DRAWINGS

Understanding that the drawings depict only exemplary configurations and are not therefore to be considered limiting in scope, the exemplary configurations will be described with additional specificity and detail through the use of the accompanying drawings, in which.

In accordance with common practice, the various described features are not drawn to scale but are drawn to emphasize specific features relevant to the exemplary configurations.

DETAILED DESCRIPTION

The term Radio Access Network (RAN) refers to the part of a mobile communication network that connects user equipment (UEs) to fixed network infrastructure through wireless radio channels, over specific radio frequencies. A cloud radio access network (C-RAN) is a point-to-multipoint distributed base station with one or more baseband controllers that are physically separated from, and communicatively coupled to, multiple radio points (RPs).

Uplink (UL) interference rejection may be employed in a C-RAN so that multiple UEs in frequency reuse will be able to have good uplink performance. For example, Layer-1 (L1) processing at the C-RAN may include Interference Rejection Combining (IRC) to reduce the mutual interference experienced (in the reused uplink physical resource blocks (PRBs)) by each UE in frequency reuse. But the L1 processing at the C-RAN typically does not report the signal-to-interference-plus-noise ratio (SINR) after IRC rejection since this requires extensive computational CPU cycles. Not accounting for the SINR gain of IRC in the transmit power control for the UE may result in UEs transmitting with higher power than is necessary, and therefore draining the transmitting UE's battery and creating more interference than necessary for other UEs 110.

In contrast, the present systems and methods perform transmit power control using a less computationally-intensive pre-IRC SINR, then selectively modify transmit power control decisions for UEs to account for IRC gain. Accordingly, the transmit power control described herein may ensure that the UEs transmit at the optimum lowest power sufficient to support full throughput at a maximum modulation and coding scheme (MCS_max) for the UEs. MCS_max may be any suitable value, e.g., 23 or 28 for LTE.

Since determining a post-IRC SINR (for use in transmit power control) is computationally intensive, it is not desirable to use for transmit power control (TPC). Using the pre-IRC SINR, however, is less computationally-intensive and can account for SINR gains made during IRC when the UE operates in the presence of interference. Additionally, the transmit power control described herein may account for other errors and inaccuracy in the SINR (e.g., caused by noise power being inaccurately measured over a single transmission time interval (TTI)), even in the absence of interference.

Figure 1A:
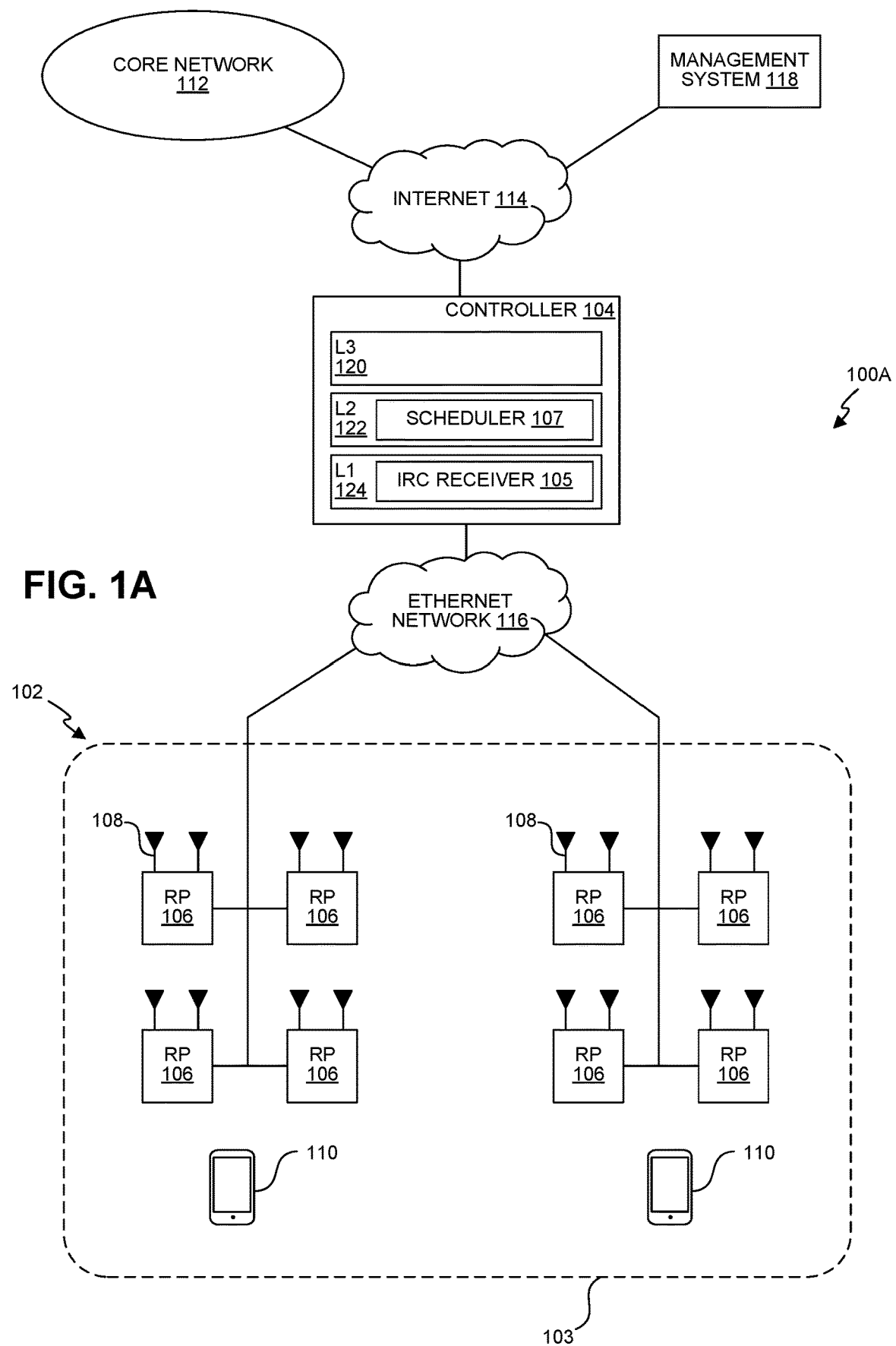
FIG. 1A is a block diagram illustrating one example of a radio access network (RAN) system in which the transmit power control (TPC) techniques described here can be implemented.

FIG. 1A is a block diagram illustrating one example of a radio access network (RAN) system 100A in which the transmit power control (TPC) techniques described here can be implemented. The system 100A is deployed at a site 102 to provide wireless coverage and capacity for one or more wireless network operators. The site 102 may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium or a densely-populated downtown area).

In the example shown in FIG. 1A, the system 100A is implemented at least in part using a C-RAN (point-to-multipoint distributed base station) architecture that employs at least one baseband unit 104 and multiple radio points (RPs) 106 serving at least one cell 103. The system 100A is also referred to here as a "C-RAN system" 100A. The baseband units 104 are also referred to here as "baseband controllers" 104 or just "controllers" 104. Each RP 106 includes or is coupled to one or more antennas 108 via which downlink radio frequency (RF) signals are radiated to user equipment (UE) 110 and via which uplink RF signals transmitted by UEs 110 are received.

More specifically, in the example shown in FIG. 1A, each RP 106 comprises two antennas 108. Each RP 106 can include or be coupled to a different number of antennas 108.

The system 100A is coupled to the core network 112 of each wireless network operator over an appropriate back-haul. In the example shown in FIG. 1A, the Internet 114 is used for back-haul between the system 100A and each core network 112. However, it is to be understood that the back-haul can be implemented in other ways.

The example system 100A shown in FIG. 1A may be implemented as a Long Term Evolution (LTE) radio access network providing wireless service using an LTE air interface. LTE is a standard developed by 3GPP standards organization. In this example, the controller 104 and RPs 106 together are used to implement an LTE Evolved Node B (also referred to here as an "eNodeB" or "eNB") that is used to provide user equipment 110 with mobile access to the wireless network operator's core network 112 to enable the user equipment 110 to wirelessly communicate data and voice (using, for example, Voice over LTE (VoLTE) technology).

Also, in this exemplary LTE embodiment, each core network 112 is implemented as an Evolved Packet Core (EPC) 112 comprising standard LTE EPC network elements such as, for example, a mobility management entity (MME) (not shown) and a Serving Gateway (SGW) (not shown) and, optionally, a Home eNodeB gateway (HeNB GW) (not shown) and a Security Gateway (SeGW) (not shown).

Moreover, in this example, each controller 104 communicates with the MME and SGW in the EPC core network 112 using the LTE S1 interface and communicates with other eNodeBs using the LTE X2 interface. For example, the controller 104 can communicate with an outdoor macro eNodeB (not shown) via the LTE X2 interface.

Each controller 104 and the radio points 106 can be implemented so as to use an air interface that supports one or more of frequency-division duplexing (FDD) and/or time-division duplexing (TDD). Also, the controller 104 and the radio points 106 can be implemented to use an air interface that supports one or more of the multiple-input-multiple-output (MIMO), single-input-single-output (SISO), single-input-multiple-output (SIMO), multiple-input-single-output (MISO), and/or beam forming schemes. For example, the controller 104 and the radio points 106 can implement one or more of the LTE transmission modes. Moreover, the controller 104 and/or the radio points 106 can be configured to support multiple air interfaces and/or to support multiple wireless operators.

In the example shown in FIG. 1A, the front-haul that communicatively couples each controller 104 to the one or more RPs 106 is implemented using a standard ETHERNET network 116. However, it is to be understood that the front-haul between the controllers 104 and RPs 106 can be implemented in other ways.

Generally, one or more nodes in a C-RAN perform analog radio frequency (RF) functions for the air interface as well as digital Layer-1, Layer-2, and Layer-3 (of the 3GPP LTE specifications) functions for the air interface.

In the example shown in FIG. 1A, each controller 104 comprises Layer-3 (L3) functionality 120, Layer-2 (L2) functionality 122, and Layer-1 (L1) functionality 124 configured to perform at least some of the Layer-3 processing, Layer-2 processing, and Layer-1 processing, respectively, for the LTE air interface implemented by the RAN system 100A, and each RP 106 includes (optionally) Layer-1 functionality (not shown) that implements any Layer-1 processing for the air interface that is not performed in the controller 104 and one or more radio frequency (RF) circuits (not shown) that implement the RF front-end functions for the air interface and the one or more antennas 108 associated with that RP 106.

Each controller 104 can be configured to perform all of the digital Layer-3, Layer-2, and Layer-1 processing for the air interface, while the RPs 106 (specifically, the RF circuits) implement only the RF functions for the air interface and the antennas 108 associated with each RP 106. In that case, IQ data representing time-domain symbols for the air interface is communicated between the controller 104 and the RPs 106. Communicating such time-domain IQ data typically requires a relatively high data rate front haul. This approach (communicating time-domain IQ data over the front haul) is suitable for those implementations where the front-haul ETHERNET network 116 is able to deliver the required high data rate.

If the front-haul ETHERNET network 116 is not able to deliver the data rate needed to front haul time-domain IQ data (for example, where the front-haul is implemented using typical enterprise-grade ETHERNET networks), this issue can be addressed by communicating IQ data representing frequency-domain symbols for the air interface between the controllers 104 and the RPs 106. This frequency-domain IQ data represents the symbols in the frequency domain.

Where frequency-domain IQ data is front-hauled between the controllers 104 and the RPs 106, each controller 104 can be configured to perform all or some of the digital Layer-3, Layer-2, and Layer-1 processing for the air interface. In this case, the Layer-1 functions in each RP 106 can be configured to implement the digital Layer-1 processing for the air interface that is not performed in the controller 104. For example, in this example, each controller 104 may implement an Interference Rejection Combining (IRC) receiver 105 and a scheduler 107 for the cell 103.

Where the front-haul ETHERNET network 116 is not able to deliver the data rate need to front haul (uncompressed) frequency-domain IQ data, the IQ data can be compressed prior to being communicated over the ETHERNET network 116, thereby reducing the data rate needed to communicate such IQ data over the ETHERNET network 116.

Data can be front-hauled between the controllers 104 and RPs 106 in other ways (for example, using front-haul interfaces and techniques specified in the Common Public Radio Interface (CPRI) and/or Open Base Station Architecture Initiative (OBSAI) family of specifications).

Each controller 104 and RP 106 (and the functionality described as being included therein) can be implemented in hardware, software, or combinations of hardware and software, and the various implementations (whether hardware, software, or combinations of hardware and software) can also be referred to generally as "circuitry" or a "circuit" configured to implement at least some of the associated functionality. When implemented in software, such software can be implemented in software or firmware executing on one or more suitable programmable processors. Such hardware or software (or portions thereof) can be implemented in other ways (for example, in a field programmable gate array (FPGA), application specific integrated circuit (ASIC), etc.). Also, the RF functionality can be implemented using one or more RF integrated circuits (RFICs) and/or discrete components. Each controller 104 and RP 106 can be implemented in other ways.

In the example shown in FIG. 1A, a management system 118 is communicatively coupled to the controllers 104 and RPs 106, for example, via the Internet 114 and ETHERNET network 116 (in the case of the RPs 106).

In the example shown in FIG. 1A, the management system 118 communicates with the various elements of the system 100A using the Internet 114 and the ETHERNET network 116. Also, in some implementations, the management system 118 sends and receives management communications to and from the controllers 104, each of which in turn forwards relevant management communications to and from the RPs 106.

During "uplink reuse" (or simply "frequency reuse") separate uplink data is simultaneously transmitted from two (or more) different UEs 110 over the Physical Uplink Shared Channel (PUSCH) using the same resource elements. Typically, these situations will arise when the UEs 110 are sufficiently physically separated from each other so that the different uplink transmissions do not interfere with each other when transmitted from the different UEs 110.

As described below, the controller 104 may implement (e.g., in L2 processing) transmit power control for connected UEs 110 based on at least the signal-to-interference-plus-noise ratio (SINR), for each of the connected UEs 110, measured at the controller 104. For example, the controller 104 may individually instruct the UEs 110 to increase or decrease their respective transmit power levels so that the SINR measured at the controller 104 matches (or is within a threshold of) a target SINR, e.g., 16 dB.

Each controller 104 may also implement an Interference Rejection Combining (IRC) receiver 105 to reduce mutual interference experienced, in reused uplink PUSCH PRBs, by UEs 110 in uplink reuse. Using a post-IRC SINR during transmit power control will reflect the gain due to IRC interference rejection in the decoding of the PUSCH data symbols in L1 processing, but the post-IRC SINR is computationally-intensive to determine.

In contrast, the pre-IRC SINR is less computationally intensive, but will not itself account for the gain due to IRC interference rejection in the decoding of the PUSCH data symbols in L1 processing. Accordingly, using the pre-IRC SINR alone as the basis for transmit power control for a UE 110 will (1) cause the UE 110 to transmit with a transmit power level higher than is necessary to achieve maximum throughput; and/or (2) create additional interference for other UEs 110 in uplink reuse with the UE 110.

Therefore, in addition to using the pre-IRC SINR, the controller 104 may use the number (N) of consecutively received PUSCH transmissions meeting at least one criteria when performing transmit power control for a UE 110. In one configuration, a PUSCH transmission must meet the following criteria to increment N: (1) be a first transmission from the UE 110 (e.g., not a retransmission); (2) be sent using a maximum modulation and coding scheme (MCS) that can be supported for a target BLER, e.g., MCS=MCS_max; and (3) pass a cyclic redundancy check (CRC) in the controller 104. In another configuration, a PUSCH transmission must meet the following criteria to increment N: (1) be a first transmission from the UE 110 (e.g., not a retransmission); (2) be sent using a maximum MCS that can be supported for a target BLER (e.g., MCS=MCS_max); (3) pass a cyclic redundancy check (CRC) in the controller 104; and (4) the estimated post-IRC SINR, which comprises the average pre-IRC SINR (for the reception of the PUSCH transmission) plus a determined delta is greater than or equal to an SINR threshold. The SINR threshold may be configurable, e.g., with a default of a SINR required to support the maximum MCS, plus 2 dB.

It should be noted that the present systems and methods are equally applicable to receivers using other interference rejection techniques (other than IRC), such as Minimum Mean Square Equalization (MMSE), which are also computationally intensive. Additionally, while the present systems and methods are described assuming PUSCH transmissions, transmissions on other (shared or data) channels may also be utilized, e.g., Physical Uplink Control Channel (PUCCH) transmissions.

Additionally, the present systems and methods may account for other errors/inaccuracies in the estimated SINR, even when the UE 110 transmits in the absence of (or with very low) interference. For example, in an interference-less scenario, the RP 106 performance may become limited by receiver noise, i.e., the noise figure of its radio. The accuracy of a measurement of noise power (at the RP 106) depends on the number of I/Q samples considered in the average. The mean noise power measured by the L1 processing 124 over one TTI may be a few (e.g., 2-3) dB higher or lower than a more accurate measurement averaged over more (e.g., 64) TTIs. This can produce an L1-estimated SINR that is different than the actual SINR, resulting in excess or insufficient TPC commands to UE 110 being issued by the L2 122 transmit power control. Consequently, the UE 110 may transmit with insufficient power to obtain maximum throughput, or with excess power at maximum throughput.

The present systems and methods account for such non-IRC-related errors/inaccuracies in the estimated SINR because the link adaptation will be based, at least partially, on the sequence of ACKs and/or NACKs received from the UE 110, which reflects the actual SINR on the channel. Therefore, the present systems and methods may account for and correct for other (e.g., all) sources of SINR measurement error (in addition to those resulting from estimating the SINR before IRC is performed).

Figure 1B:
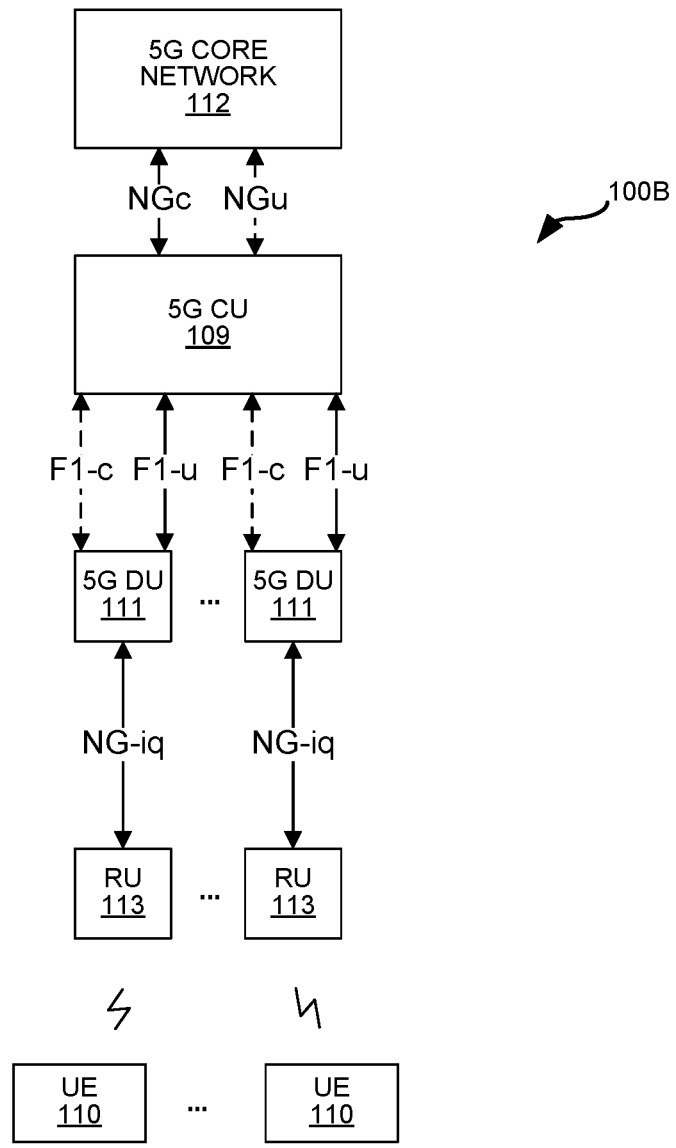
FIG. 1B is a block diagram illustrating another example of a radio access network (RAN) system in which the transmit power control (TPC) techniques described here can be implemented.

FIG. 1B is a block diagram illustrating another example of a radio access network (RAN) system 100B in which the transmit power control (TPC) techniques described here can be implemented. The system 100B includes 3GPP Fifth Generation (5G) elements. Optionally, the system 100B may additionally include 4G elements. Each of the elements may be implemented using at least one processor executing instructions stored in at least one memory. In some configurations, at least some of the elements are implemented using a virtual machine.

Fifth Generation (5G) standards support a wide variety of applications, bandwidth, and latencies while supporting various implementation options. In the system 100, interfaces denoted with "-c" or simply "c" (illustrated with dashed lines) provide control plane connectivity, while interfaces denoted with "-u" or simply "u" (illustrated with solid lines) provide user plane connectivity.

FIG. 1B illustrates a C-RAN 100B implementing an example of a 5G Next Generation NodeB (gNB). The architecture of a Next Generation NodeB (gNB) is partitioned into a 5G Central Unit (CU) 109, one or more 5G Distributed Unit (DU) 111 and one or more 5G Remote Units (RU) 113. A 5G Central Unit (CU) 109 is a node that implements the gNB controller functions such as the transfer of user data, mobility control, radio access network sharing, positioning, session management, etc. The 5G CU 109 controls the operation of the Distributed Units (DUs) 111 over an interface (including F1-c and F1-u for the control plane and user plane, respectively).

The Distributed Units (DUs) 111 may be nodes that implement a subset of the gNB functions, depending on the functional split (between CU 109 and DU 111). In some configurations, the L3 processing (of the 5G air interface) may be implemented in the CU 109 and the L2 processing (of the 5G air interface) may be implemented in the DU 111. The operation of each DU 111 is controlled by a CU 109. The functions of the DU 111 may include Radio Link Control (RLC), portions of Medium Access Control (MAC) and/or portions of the physical (PHY) layer functions. A Distributed Unit (DU) 111 can optionally offload some of its PHY (L1) processing (of the 5G air interface) to RUs 113.

In FIG. 1B, the C-RAN 100B includes a single CU 109, which handles control plane functions and user plane functions. The 5G CU 109 (in the C-RAN 100B) may communicate with at least one wireless service provider's Next Generation Cores (NGC) 112 using 5G NGc and 5G NGu interfaces. In some 5G configurations (not shown), a 5G CU is split between a CU-C 109B that handles control plane functions and a CU-U 109C that handles user plane functions.

In some 5G configurations, the RUs (RUs) 113 may communicate baseband signal data to the DUs 111 on an NG-iq interface. In some 5G configurations, the RUs 113 may implement at least some of the L1 and/or L2 processing. In some configurations, the RUs 113 may have multiple ETHERNET ports and can communicate with multiple switches.

Any of the interfaces in FIG. 1B may be implemented using a switched ETHERNET (or fiber) network. Additionally, if multiple CUs 109 are present (not shown), they may communicate with each other using any suitable interface, e.g., an Xn (Xn-c and Xn-u) and/or X2 interface. A fronthaul interface may facilitate any of the NG-iq, F1-c, and/or F1-u interfaces in FIG. 1B.

Where functionality of a baseband controller 104 is discussed herein, it is equally applicable to a 5G CU 109 or 5G DU 111 in 5G configurations. Therefore, where a C-RAN 100 is described herein, it may include 4G elements (as in FIG. 1A) and/or 5G elements (as in FIG. 1B). Similarly, where functionality of an RP 113 is described herein, it is equally applicable to a 5G RU 113.

In some configurations, the 5G CU 109 and/or DUs 111 may implement any of the functionality described herein, e.g., implemented as a set of instructions stored in a memory and executed by at least one processor in the respective device. Specifically, the 5G CU 109 and/or DUs 111 may implement the transmit power control described herein.

Figure 2:
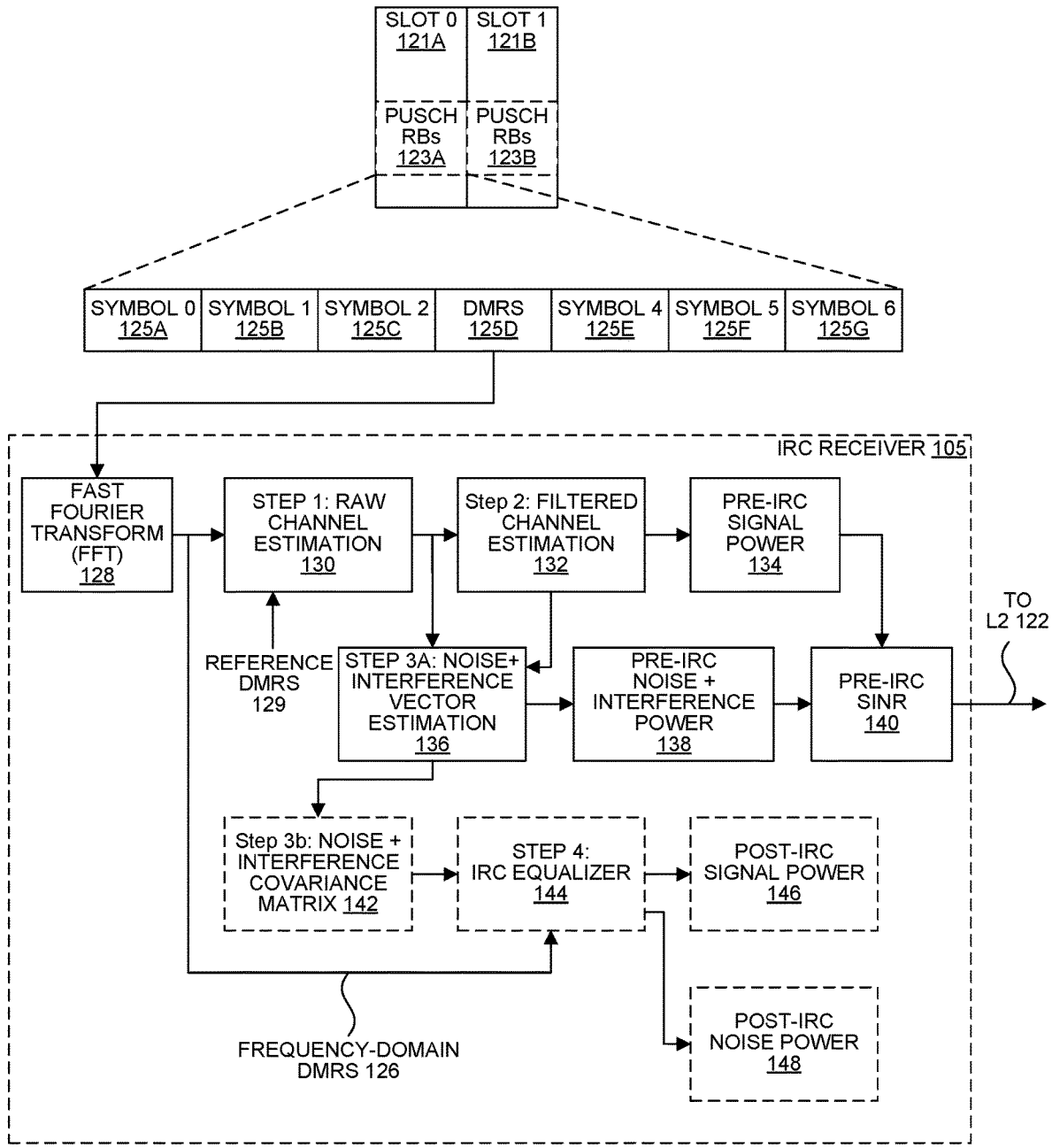
FIG. 2 is a block diagram illustrating example Layer-1 (L1) processing in a controller.

FIG. 2 is a block diagram illustrating example Layer-1 (L1) processing in a controller 104. Specifically, FIG. 2 illustrates an IRC receiver 105 that determines a pre-IRC SINR 140 based on a DMRS 125D received from a UE 110.

The IRC receiver 105 may utilize Interference Rejection Combining (IRC) on uplink transmissions from the connected UEs 110 in frequency reuse. IRC may reduce the mutual interference experienced in the reused uplink PRBs by each UE 110 in frequency reuse. However, in some configurations, the IRC receiver 105 may not report the SINR of PUSCH transmissions after IRC rejection since this requires extensive computational CPU cycles as explained below.

The 3GPP LTE air-interface has defined a Demodulation Reference Symbol (DMRS) 125D in every slot 121A-B. The DMRS 125D for PUSCH occupies the fourth out of every seven symbols 125A-G in a slot 121 (e.g., a 0.5 ms slot). The DMRS 125D is a known frequency-reuse-layer-specific Zadoff-Chu symbol sequence. In other words, each DMRS 125D is specific to a frequency-reuse layer and a specific Zadoff-Chu symbol sequence assigned/configured, by the L1 processing implementation in the controller 104, at the UE 110. The DMRS 125D is used by the IRC receiver 105 to estimate the uplink channel and thereafter to demodulate the other six (non-DMRS) PUSCH symbols 125 in the slot 121. The IRC receiver 105 will also use the DMRS 125D from a particular UE 110 for interference rejection (e.g., using IRC) and to estimate the SINR experienced in the uplink from that particular UE's transmission in the slot 121.

This pre-IRC SINR 140 (estimated in the IRC receiver 105) may be used by the transmit power control (e.g., in L2 functionality 122 at the controller 104) to control the transmit power of the UE 110. For example, the L2 transmit power control functionality may send commands to increase or decrease the UE 110 transmit power such that a target SINR (measured at the controller 104) is obtained. Achieving the target SINR may enable the scheduler 107 to schedule the UE 110 to transmit maximum uplink transport block sizes so that it will be received by the IRC receiver 105 with a low block error rate (BLER).

In the IRC receiver 105, the SINR processing is done in the frequency-domain. Accordingly, a Fast Fourier Transform (FFT) operation 128 may be performed on the received time-domain I,Q samples of the DMRS symbol 125D to obtain a frequency-domain DMRS 126, e.g., after cyclic prefix removal.

After FFT 128, one or more steps are performed in the IRC receiver 105, described below. Each of steps 1-4 described below may be used for PUSCH data symbols 125 and/or a DMRS 125D. However, it should be noted that not every step illustrated in FIG. 2 is performed in every configuration. In one configuration, steps 1-3a are performed for PUSCH 125 and DMRS 125D, while steps 3b-4 are performed for PUSCH symbol equalization (but not DMRS symbol equalization). The steps and other functionality associated with the IRC receiver 105 described herein may be implemented by at least one processor (e.g., DSP(s), CPU(s), FPGA(s), processing core(s) within a multi-core processor, etc.) executing instructions stored in at least one memory.

Step 1: Raw Channel Estimation

In step 1 130, a raw channel estimate is obtained in the frequency domain. A raw channel estimate may be obtained by complex multiplying of the received DMRS symbol ($y^{a,s,sc}$) 125D with a conjugate of the reference DMRS Zadoff-Chu sequence 129 assigned to that frequency reuse layer, denoted as (DMRS)*:

$$h_{raw}^{a,s,sc} = (y^{a,s,sc})(\text{DMRS})^* \qquad (1)$$

where $h_{raw}^{a,s,sc}$ is the raw channel estimate (e.g., including signal power, noise power, and interference power present on the channel); a is the antenna index; s is the slot index; and sc is the subcarrier index.

Step 2: Filtered Channel Estimation

In step 2 132, the filtered channel estimate ($h^{a,s,sc}$) is determined, which will enable the uncorrelated noise on the PUSCH resource blocks (RBs) 123 to be removed from the raw channel estimate, but not the correlated co-channel interference on the same RBs 123. In other words, the filtered channel estimate ($h^{a,s,sc}$) includes signal power and correlated interference power on the channel but not uncorrelated noise power. The filtered channel estimate ($h^{a,s,sc}$) is determined by filtering the raw channel estimates ($h_{raw}^{a,s,sc}$) for each subcarrier (the DMRS 125D is transmitted across RBs 123 that have already been granted to the UE 110 for uplink transmission, and each RB 123 has 12 subcarriers) with its surrounding subcarriers using an L-tap moving average finite impulse response (FIR) filter:

$$h^{a,s,sc} = \frac{1}{L}\sum_{i=0}^{L-1} c_i h_{raw}^{a,s,sc-(\frac{L-1}{2})+i} \quad (2)$$

where $h^{a,s,sc}$ is the filtered channel estimate; $c_i$ is the filter tap at index i; L is the number of filter taps, e.g., L=15 for $N_{RB}>1$ and L=11 for $N_{RB}$ (e.g., $N_{RB}=1$), which is the number of RBs granted to the UE 110 in the uplink for transmission by the scheduler 107 of L2 122.

Therefore, the filtering in step 2 132 may implement a moving average across the raw channel estimate per subcarrier to produce a filtered channel estimate that doesn't have noise, but still has interference in it.

Step 3a: Noise Plus Interference Vector

The IRC receiver 105 estimates interference on the PUSCH by exploiting the spatial interference correlation present between antennas and then suppressing it. The interfering signal(s) could result from UE(s) 110 transmitting in adjacent frequency reuse zones or UE(s) 110 associated with a different macro BS or small cell but transmitting on the same RBs 123. This spatial interference correlation may be determined based on a spatial noise covariance matrix which is computed from a noise plus interference vector ($N^{a,s,sc}$) in step 3a 136. The noise plus interference vector ($N^{a,s,sc}$) may be formed by taking the difference between the filtered channel estimate ($h^{a,s,sc}$) and the raw channel estimate ($h_{raw}^{a,s,sc}$) for each antenna and for each allocated PRB (Physical Resource Block) for the UE 110:

$$N^{a,s,sc} = h^{a,s,sc} - h_{raw}^{a,s,sc} \quad (3)$$

Step 3b: Noise Plus Interference Covariance Matrix

Next, the noise plus interference covariance matrix for a 2-Rx Antenna system is computed as a 2×2 matrix (in optional step 3b 142) for every PRB:

$$C_{n_{i,j}}^{s,p} = \frac{1}{12}\sum_{sc=12p}^{12p+11} N^{i,s,sc}(N^{j,s,sc})^* \quad (4)$$

where $C_{n_{i,j}}^{s,p}$ is the noise plus interference covariance matrix; i and j are Rx antenna indices; p is the PRB of 12 subcarriers; and $(N^{a,s,sc})^*$ is the conjugate of the noise plus interference vector ($N^{a,s,sc}$) from step 3a.

Therefore, the noise plus interference covariance matrix ($C_{n_{i,j}}^{s,p}$) is computed in Step 3b based on a correlation between the noise plus interference vector ($N^{a,s,sc}$) across subcarriers. The noise plus interference covariance matrix ($C_{n_{i,j}}^{s,p}$) is computed for every PRB and every subcarrier. The noise plus interference covariance matrix ($C_{n_{i,j}}^{s,p}$) indicates the spatial interference correlation for the channel.

Step 3b 142 may be optional for the DMRS symbol 125D in the sense that it may not be necessary for the transmit power control herein because it is not used to determine the pre-IRC SINR 140. However, step 3b 142 may still be performed for IRC equalization of PUSCH data symbols 144, discussed below. Therefore, in some configurations, step 3b 142 is performed for subsequent PUSCH equalization, but not for transmit power control purposes.

Step 4: Equalization

Optional step 4 144 is described below for DMRS 125D equalization, which is computationally-intensive and may not be performed for the DMRS 125D, e.g., step 4 144 may be especially CPU-cycle-intensive for higher LTE Bandwidths of 20 Mhz where the equalization has to be done across 100 RBs. However, in some configurations (e.g., standard IRC), the other six (non-DMRS 125D) PUSCH symbols 125 received in a slot 121 may be equalized similar to step 4 144 below. Therefore, in some configurations, equalization is performed for PUSCH symbols 125, but not the DMRS 125D.

IRC rejects interference based on its spatial properties relative to the desired signal. So, in order to reject the interference and obtain a post-IRC SINR, the final step in the IRC receiver 105 would be to equalize the received DMRS symbol 125D, using the noise plus interference covariance matrix ($C_n$) from step 3b 142 and the filtered channel estimate (H) in the following equation:

$$\hat{y} = (H^H C_n^{-1} H + C_x^{-1})^{-1} H^H C_n^{-1} y \quad (5)$$

Where $\hat{y}$ is the interference-rejected, or equalized, DMRS symbol 125D (or PUSCH symbols 125); where H is the filtered channel estimate output by step 2 132 described above, e.g., a matrix of $N_{RxAnt}$ rows and $N_{TxAnt}$ columns; $C_n$ is the noise plus interference covariance matrix described above; and $C_x$ is the covariance matrix of transmitted signal $N_{RxAnt} \times N_{TxAnt}$, and is assumed as 1. $N_{RxAnt}$ is the number of receive antennas used to receive the uplink transmission. $N_{TxAnt}$ is the number of transmit antennas used to transmit the uplink transmission.

After equalization, the post-IRC signal power 146 may be determined based on the equalized DMRS output ($\hat{y}$). First, an average is taken over the 12 subcarriers of each RB 123 to improve the signal power estimation by filtering out some noise after equalization. This additional filtering is performed because equalization may only remove correlated interference and since noise is not correlated. In other words, step 2 132 may remove noise introduced by the IRC receiver 105 (which includes the RF receiver as well) while 146 may remove any residual noise that remains as well as any noise from the equalization process 144. Second, the signal power of each RB estimated above is averaged over all RBs 123.

Therefore, in one configuration, the post-IRC signal power 146 for a UE 110 may be determined as follows: (1) determine the signal power ($I^2+Q^2$) on each of 12 resource elements, each resource element being a symbol on a respective one of the 12 subcarriers; (2) determine the average signal power per RB by averaging across the 12 resource element signal powers; and (3) determining the post-IRC signal power 146 by averaging the average signal powers across the allocated RBs in the uplink for that UE 110. Steps (2) and (3) may provide some filtering benefit.

The post-IRC noise power 148 may be determined as follows. First, the difference between two consecutive equalized subcarriers is determined. The difference is determined for I and Q samples separately. Second, the power of those terms is averaged over all subcarriers. In other words, the post-IRC noise power 148 is determined as the sum of squares of the I difference terms and the Q difference terms.

However, step 4 144 (if it were performed for the DMRS 125D) is computationally-intensive. Therefore, the present systems and methods may implement transmit power control by avoiding the step 4 144 computation and instead using the pre-IRC SINR 140 to ensure that the UEs 110 transmit at the optimum lowest power sufficient to support full throughput at highest MCS (e.g., MCS=MCS_max) for the UEs 110. In LTE configurations, MCS_max may be 23 or 28.

The pre-IRC SINR 140 may be determined using steps 1 130, step 2 132, and step 3a 136 (and the FFT 128), but not step 3b 142 or step 4 144. Specifically, the pre-IRC SINR 140 may be determined based on a pre-IRC signal power 134 and a pre-IRC noise plus interference power 138. The pre-IRC signal power 134 may be determined based on the filtered channel estimate ($h^{a,s,sc}$) from step 2 132. The pre-IRC noise plus interference power 138 may be determined from the noise plus interference vector ($N^{a,s,ss}$) in step 3a 136.

Using the pre-IRC SINR 140 may avoid the computationally-expensive post-IRC SINR computation (of step 4 144), while still being able to benefit from/account for the full IRC interference rejection gain obtained for the PUSCH data path of the IRC receiver 105.

In other words, the controller 104 may reuse the pre-IRC SINR 140 (step 1 and 2 and step 3a of IRC rejection flow for PUSCH data symbols) for transmit power control, thus saving CPU cycles. The downside to using pre-IRC SINR 140 is that it does not, itself, account for any gain due to interference rejection that would have been obtained during the decoding of the PUSCH data symbols 125 in the IRC receiver 105. In other words, the pre-IRC SINR 140 output to the L2 122 transmit power control functionality may not represent the SINR gain obtained by IRC in the IRC receiver 105, which may cause the L2 122 transmit power control to command the UEs to transmit at a higher power level ("hotter") than necessary to obtain maximum throughput.

For example, the L2 122 transmit power control may command a UE 110 to increase its transmit power (via Transmit Power Control (TPC) UP commands) until the uplink pre-IRC SINR 140 reaches the target SINR (e.g., 16 dB), e.g., the target SINR required for maximum throughput (e.g., MCS=23) decoding in the case of no-interference case. However, a given pre-IRC SINR 140 (e.g., 16 dB) may correspond to a much higher post-IRC SINR (e.g., 24 dB), which may be unnecessarily high to achieve maximum throughput (e.g., MCS=23) for a target BLER (e.g., less than 10%).

In other words, if the SINR gain with IRC is X dB, the UE 110 may transmit X dB hotter than necessary (to obtain maximum throughput) if pre-IRC SINR 140 alone is the basis for TPC for powering up the UE 110 to reach the target SINR (e.g., 16 dB) required for maximum throughput (e.g., MCS=23). This may also result in the UE 110 producing uplink interference X dB higher than necessary for other UEs 110 in reuse.

In addition to accounting for the full IRC interference rejection gain obtained for the PUSCH data path of the IRC receiver 105, the transmit power control described herein may correct for other inaccuracies in the estimated SINR, even in the absence of interference. In other words, the present systems and methods provide accurate TPC even in the presence of any errors/inaccuracies in the L1-estimate of the SINR, whether those inaccuracies/errors are related to calculating the SINR before IRC or other reasons related to the way the L1 processing 124 estimates SINR.

Transmit Power Control Using Pre-IRC SINR

The L2 122 transmit power control functionality may include several independent adaptation loops, e.g., in a scheduler 107 in L2 122. An inner Transmit Power Control (TPC) loop may adjust (e.g., increase or decrease) the transmit power of the UE 110 such that the SINR measured at the controller 104 matches the target SINR (e.g., 16 dB). An outer Link Adaptation (LA) loop may adjust the channel rate (i.e., MCS) in order to track changes in the channel signal gain, interference level, and/or noise level. In one example, the outer LA loop may adjust the MCS of a UE 110 based on an average (pre-IRC) SINR as well as the average BLER on uplink transmissions (across a measurement interval) from the UE 110.

The inner TPC loop determines the average SINR ($SINR_{measured}$) from the signal power and noise power measurements (pre-IRC SINR 140), measured and reported by the L1 function 124 implemented in the controller 104 every transmission time interval (TTI, e.g., 1 ms), over a measurement interval. For example, the average SINR may be the Maximal Ratio Combining (MRC) of multiple pre-IRC SINRs 140 across the $N_{RxAnt}$ receive antennas 108, each determined from a respective pre-IRC signal power 134 and pre-IRC noise plus interference power 138 measurement per receive antenna 108. The average SINR may be compared against $SINR_{target}$ (e.g., 16 dB). If the UE-specific $SINR_{measured}<SINR_{target}$ and Power Headroom (PHR) reported by UE 110 is non-zero (meaning the UE 110 can increase transmit power), the inner TPC loop may increase the UE 110 Transmit power by sending TPC UP Commands to the UE 110 until the $SINR_{measured}$ matches the target SINR (e.g., 16 dB). If the block error rate (BLER) at this point (e.g., measured from PUSCH transmissions from the UE 110 over a measurement interval) is less than 10%, then the outer LA loop may continuously adapt the MCS of the UE 110 to achieve the highest (average) MCS providing a target BLER (e.g., less than 10%) for that $SINR_{measured}$ value.

The outer LA loop may adapt the MCS potentially at a much faster rate than TPC commands are issued, e.g., in case there is interference or a change in channel signal gain. In general, the LA updates can occur as often as once per transmission time interval (TTI), whereas TPC updates are issued, for example, on the order of once per 300 TTI or once per 10 TTIs (10 TTIs, in case of low scheduled UEs 110, which have less traffic).

If a received transport block from the UE 110 passes the cyclic redundancy check (CRC) at the controller 104 (e.g., in L1 124), the scheduler 107 in L2 122 sends an acknowledgment (ACK). If there is an ACK, the average of pre-IRC SINR 140 may be adjusted by adding a delta_ack (e.g., +0.1 dB), and the average of pre-IRC SINR ($SINR_{measured}$)+ cumulative delta_ack may be mapped to a higher MCS value, e.g., because the ACK indicates that there is no interference present or the channel signal gain has improved. The UE 110 may then transmit at the MCS associated with the ($SINR_{measured}$+cumulative delta_ack). The value of delta_ack may be selected to achieve a target BLER (e.g., 10%) when MCS supported by the channel is not at its high or low extreme, e.g., between MCS=0 and MCS_max.

If the received transport block does not pass the CRC, the scheduler 107 in L2 122 sends a negative-acknowledgment (NACK). If a NACK feedback sequence is received from a scheduler 107 in L2 122, the average of pre-IRC SINR 140 may be adjusted by adding a delta_nack (e.g., −0.9 dB), and the average pre-IRC SINR ($SINR_{measured}$)+cumulative delta_nack may be mapped to a lower MCS value, e.g., because the NACK indicates that there is interference present or the channel signal gain has changed. The value of delta_nack may be selected to achieve a target BLER (e.g., 10%) when MCS supported by the channel is not at its high or low extreme, e.g., between MCS=0 and MCS_max.

Therefore, the LA may adapt the current MCS for a UE 110 based on the average of pre-IRC SINR 140 ($SINR_{measured}$) plus some cumulative delta adjustment. The delta adjustment for each uplink reception is delta_ack (e.g., +0.1 dB) if the CRC succeeds for the reception, or delta_nack (e.g., −0.9 dB) if the CRC for the reception fails. In some configurations, the values of delta_ack and delta_nack may be chosen to achieve the target BLER used is 10%, e.g., for a 1:10 ratio.

When interference is high and the post-IRC SINR is initially less than 16 dB, the outer LA loop will choose the appropriate MCS below maximum (e.g., below 23) as transmit power for the UE 110 is stepped up. When interference is high and the UE transmit power is maxed out (PHR=0) at its max power (e.g., 23 dBm) before reaching MCS 23, the outer LA loop may be used to provide the appropriate MCS below maximum (e.g., below 23) so that the average BLER is less than the target BLER (e.g., 10%). In other high interference cases, the TPC adaptation would have achieved maximum MCS (e.g., MCS=23) throughput at an average pre-IRC SINR 140 of the target SINR (e.g., 16 dB). UE 110 transmit power may be reduced via sending TPC DOWN messages (TPC DOWN) until the point the UE 110 will be transmitting at its lowest power with the IRC rejection gain recovered and the average pre-IRC SINR 140 less than the target SINR (e.g., 16 dB).

Therefore, the L2 122 transmit power control functionality may implement a third loop (also referred to as the "TPCcapture-of-Excess-IRCGain" loop) independent from the inner TPC and outer LA loops. This third loop may be driven by the BLER associated with a UE 110 to effectively control the UE 110 to transmit at the minimum optimal power required to achieve full uplink throughput and performance at MCS=MCS_max, e.g., producing a similar result to using a computationally intensive post-IRC equalized SINR.

Example Implementation of Transmit Power Control Using Pre-IRC SINR

The inner TPC loop may send a TPC command based on the average pre-IRC SINR 140 ($SINR_{measured}$) at the controller 104. Therefore, during each TPC update, a TPC DOWN, TPC UP, or a TPC UNCH command may be sent to the UE 110. In response to a TPC DOWN command from the scheduler 107 in L2 122, a UE 110 will decrease its transmit power. In response to a TPC UP command from the scheduler 107 in L2 122, a UE 110 will increase its transmit power. In response to a TPC UNCH command from the scheduler 107 in L2 122, a UE 110 will not adjust its current transmit power. In some configurations, instead of a TPC UNCH command, no TPC command may be sent when there is no change to the UE's transmit power.

The third loop may selectively modify the TPC commands from the inner TPC loop based on a UE-specific count (N). For example, the count (N) may be kept by L2 122 in the controller 104. The count (N) may indicate the number of consecutive PUSCH transmissions received from the UE 110, starting with the most recent PUSCH transmission from the UE 110, that meet at least one criteria. The count (N) may be reset if the most recent PUSCH reception does not meet the at least one criteria. Otherwise, the count (N) can become arbitrarily large, and is not reset to zero until the UE's 110 connection terminates. Alternatively, some cap could be imposed on the count (N), e.g., N2 below.

In one configuration, a PUSCH transmission must meet the following criteria to increment the count (N): (1) be a first transmission from the UE 110 (e.g., not a retransmission); (2) be sent using a maximum MCS that can be supported for a target BLER, e.g., MCS=MCS_max; and (3) pass a cyclic redundancy check (CRC) in the controller 104. In another configuration, a PUSCH transmission must meet the following criteria to increment N: (1) be a first transmission from the UE 110 (e.g., not a retransmission); (2) be sent using a maximum MCS that can be supported for a target BLER (e.g., MCS=MCS_max); and (3) pass a cyclic redundancy check (CRC) in the controller 104; and (4) the LA estimated post-IRC SINR, which is the average pre-IRC SINR 172 (provided by the inner TPC loop 150) plus a cumulative delta (e.g., delta_ack/nack) is greater than or equal to an SINR threshold. The SINR threshold may be configurable, e.g., with a default of a post-IRC SINR, required to support the maximum MCS, plus 2 dB. In LTE configurations, MCS_max may be 23 or 28.

Received PUSCH transmissions that meet the at least one criteria may indicate that the maximum transmission rate has been achieved on the uplink (e.g., MCS=MCS_max) and there might be a possibility that the same throughput could be achieved with lower UE transmit power, assuming there has been interference rejection gain.

The count (N) may be compared with a first threshold (N1) and/or a second threshold (N2) to determine whether and how to adjust the TPC commands from the inner TPC loop. In one example, N1 and N2 are configurable values, e.g., with default values of 5 and 15, respectively.

The particular adjustments the third loop makes to the inner TPC loop are described in more detail below, but generally: (1) when N1≤N<N2, the third loop may prevent the inner TPC loop from sending TPC UP commands to the UE 110, e.g., only TPC UNCH or TPC DOWN commands are sent to the UE 110; (2) when N2≤N, the third loop will force TPC DOWN commands to be sent to the UE 110, e.g., regardless of the TPC command determined by the inner TPC loop; and (3) when N<N1, the third loop may not adjust the inner TPC loop, e.g., the TPC command determined by the inner TPC loop is sent without modification.

This selective override of TPC commands/directives (by the third loop) may produce a post-IRC SINR at approximately the target SINR (e.g., 16 dB) with the minimum transmit power for the UE 110. The at least one criteria above may identify when this additional selective override is appropriate.

Figure 3:
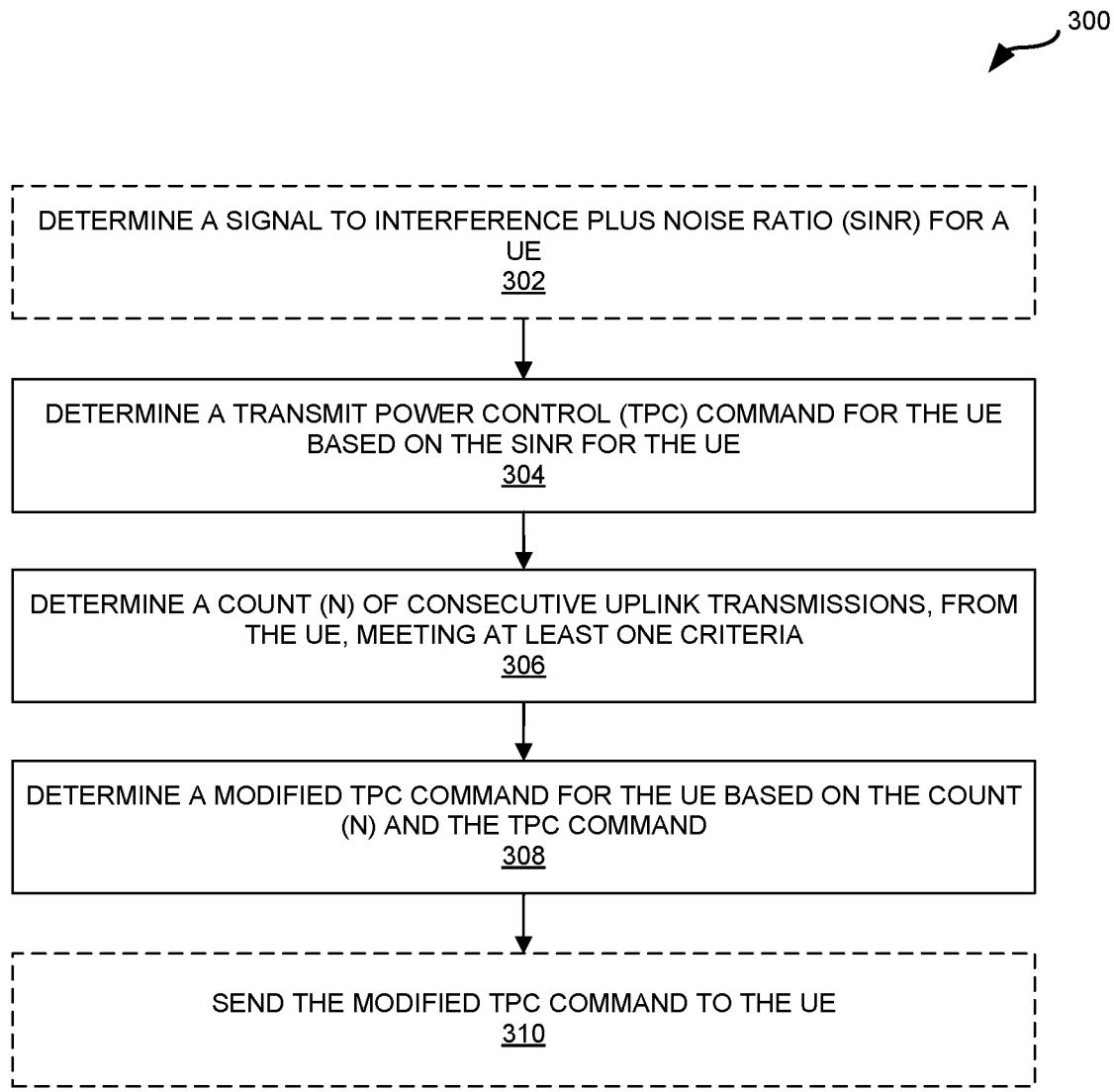
FIG. 3 is a flow diagram illustrating an example method for transmit power control using a pre-IRC SINR.

FIG. 3 is a flow diagram illustrating an example method 300 for transmit power control using an average pre-IRC SINR 140 ($SINR_{measured}$). The method 300 may be performed by at least one processor in a controller 104 in a C-RAN 100. For example, the method 300 may be performed by at least an IRC receiver 105 and L2 processing in a controller 104. Additionally, while the method 300 is described for a single UE 110, it is understood that the method 300 may optionally be performed for any number of UEs 110. Furthermore, the method 300 may optionally be performed iteratively for each UE 110 in order to continuously adapt each UE's transmit power while it is connected to the C-RAN 100.

The blocks of the flow diagram shown in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel and/or in an event-driven manner).

The method 300 may begin at optional step 302 where the at least one processor determines an SINR for a UE 110. In one configuration, the SINR is a pre-IRC SINR 140 that is determined using at least step 1 130, step 2 132, and step 3a 136 as described above. For example, the pre-IRC SINR 140 may be determined based on a pre-IRC signal power 134 (from step 2 132) and a pre-IRC noise plus interference power 138 (from step 3a 136). In one configuration, the SINR is obtained by Maximal Ratio Combining (MRC) of multiple pre-IRC SINRs 140 across the N RxAnt receive antennas 108, each determined based on a respective pre-IRC signal power 134 (from step 2 132) and pre-IRC noise plus interference power 138 (from step 3a 136) per receive antenna 108.

The method 300 may proceed at step 304 where the at least one processor determines a TPC command for the UE 110 based on the SINR for the UE 110, e.g., the average of pre-IRC SINR 140. This may include (1) an inner TPC loop sending TPC commands to the UE 110 based on the average of pre-IRC SINR 140; and (2) an outer Link Adaptation (LA) loop changing the MCS of the UE 110 based on a block error rate (BLER) of a UE 110.

For example, the inner TPC loop may compare the measured SINR (e.g., average of pre-IRC SINR 140) against a target SINR (e.g., 16 dB). If the measured SINR (e.g., average of pre-IRC SINR 140) is less than the target SINR and the Power Headroom (PHR) reported by UE 110 is non-zero, the inner TPC loop may determine that the UE 110 transmit power should increase. Therefore, the TPC command would be TPC UP until the SINR (e.g., average of pre-IRC SINR 140) matches target (e.g., 16 dB). Alternatively, the TPC command may be TPC DOWN if the SINR (e.g., average of pre-IRC SINR 140) is greater than the target SINR. Alternatively, no TPC command is generated if the SINR (e.g., average of pre-IRC SINR 140) is equal to (or approximately equal to, e.g., within a threshold of) the target SINR.

Additionally, the outer LA loop may adjust the MCS based on the average SINR ($SINR_{measured}$) and the block error rate (BLER) of a UE 110. For example, if a UE's BLER is less than 10%, then the outer LA loop may continuously adapt the MCS (e.g., increase the MCS) to achieve the highest (average) MCS providing a target BLER (e.g., less than 10%). In some configurations, the BLER is measured from multiple uplink transmissions from the UE 110 over a measurement interval. Alternatively, a single uplink transmission from the UE 110. The outer LA loop may update more often (e.g., every TTI) than the inner TPC loop (e.g., once every 10-300 TTIs).

The method 300 may proceed at step 306 where the at least one processor determines a count (N) of consecutive uplink (e.g., PUSCH) transmissions, from the UE 110, meeting at least one criteria. In one configuration, an uplink transmission must meet the following criteria for the count (N) to be incremented: (1) be a first transmission from the UE 110 (e.g., not a retransmission); (2) be sent using a maximum MCS that can be supported for a target BLER, e.g., MCS=MCS_max; and (3) pass a cyclic redundancy check (CRC) in the controller 104. In another configuration, an uplink transmission must meet the following criteria for the count (N) to be incremented: (1) be a first transmission from the UE 110 (e.g., not a retransmission); (2) be sent using a maximum MCS that can be supported for a target BLER (e.g., MCS=MCS_max); (3) pass a cyclic redundancy check (CRC) in the controller 104; and (4) the LA estimated post-IRC SINR which is the average pre-IRC SINR 172 (provided by inner TPC loop 150) plus a cumulative delta (e.g., delta_ack/nack) is greater than or equal to a configurable SINR threshold. Alternatively, less than three criteria may be used to increment count (N).

The count (N) for the UE 110 may be incremented for each consecutive uplink transmission, from the UE 110, that meets the at least one criteria. The count (N) may be reset if the most recent uplink transmission from the UE 110 does not meet the at least one criteria.

The method 300 may proceed at step 308 where the at least one processor determines a modified TPC command for the UE 110 based on the count (N) and the TPC command. This may include a third loop (or TPCcapture-of-Excess-IRCGain loop) selectively modifying the TPC command based on the count (N). In some configurations, this includes using the TPC command as the modified TPC command, e.g., without modification. In other configurations, the TPC command from the inner TPC loop may be replaced by a different TPC command.

The method 300 may proceed at optional step 310 where the at least one processor sends the modified TPC command to the UE 110. The TPC commands may be signaled to the UE 110 using LTE L2 procedures.

Figure 4:
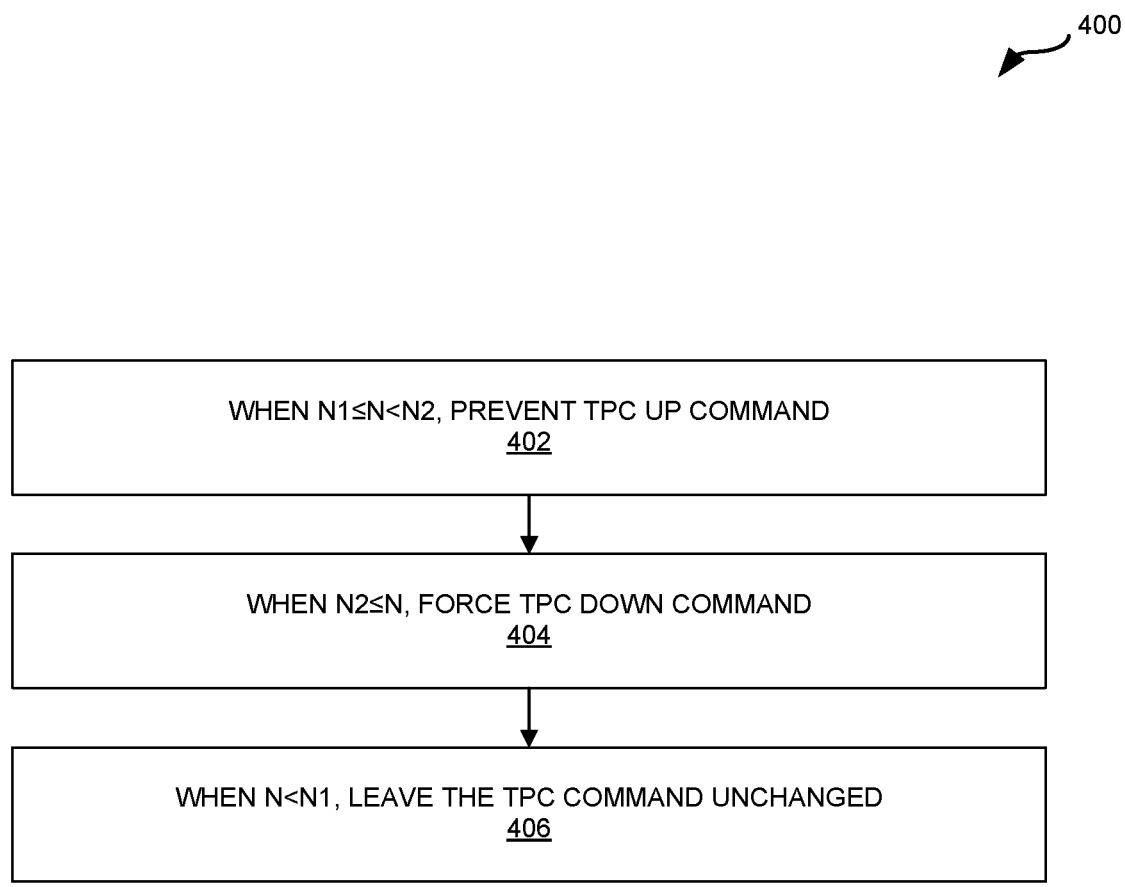
FIG. 4 is a flow diagram illustrating an example method for determining a modified transmit power control (TPC) command.

FIG. 4 is a flow diagram illustrating an example method 400 for determining a modified transmit power control (TPC) command. For example, the method 400 may be an example implementation of step 308 in the method 300 of FIG. 3. The method 400 may be performed by at least one processor in a controller 104 in a C-RAN 100, e.g., the at least one processor implementing the functionality of the third loop described herein.

The blocks of the flow diagram shown in FIG. 4 have been arranged in a generally sequential manner for ease of explanation; however, it is to be understood that this arrangement is merely exemplary, and it should be recognized that the processing associated with method 400 (and the blocks shown in FIG. 4) can occur in a different order (for example, where at least some of the processing associated with the blocks is performed in parallel and/or in an event-driven manner).

The method 400 may begin at step 402 where, when N1≤N<N2, the at least one processor (e.g., the third loop) prevents TPC UP commands. In other words, when N1≤N<N2, the modified TPC command is either TPC UNCH or TPC DOWN, but not TPC UP, e.g., the third loop may replace TPC UP commands (from step 304) with TPC UNCH commands. Therefore, if the TPC command from the inner TPC loop is TPC UP, TPC UNCH, or TPC DOWN, the modified TPC command will be TPC UNCH, TPC UNCH, or TPC DOWN, respectively.

The method 400 may proceed at step 404 where, when N2≤N, the at least one processor (e.g., the third loop) forces a TPC DOWN command, e.g., regardless of the TPC command determined by the inner TPC loop (in step 304). For example, if the TPC command from the inner TPC loop is TPC UP, TPC UNCH, or TPC DOWN, the modified TPC command will be TPC DOWN.

The method 400 may proceed at step 406 where, when N<N1, the at least one processor (e.g., the third loop) leaves the TPC command (from the inner TPC loop, e.g., in step 304) unchanged. In other words, the TPC command from the inner TPC loop (based on the pre-IRC SINR 140) is used directly as the modified TPC command.

Figure 5:
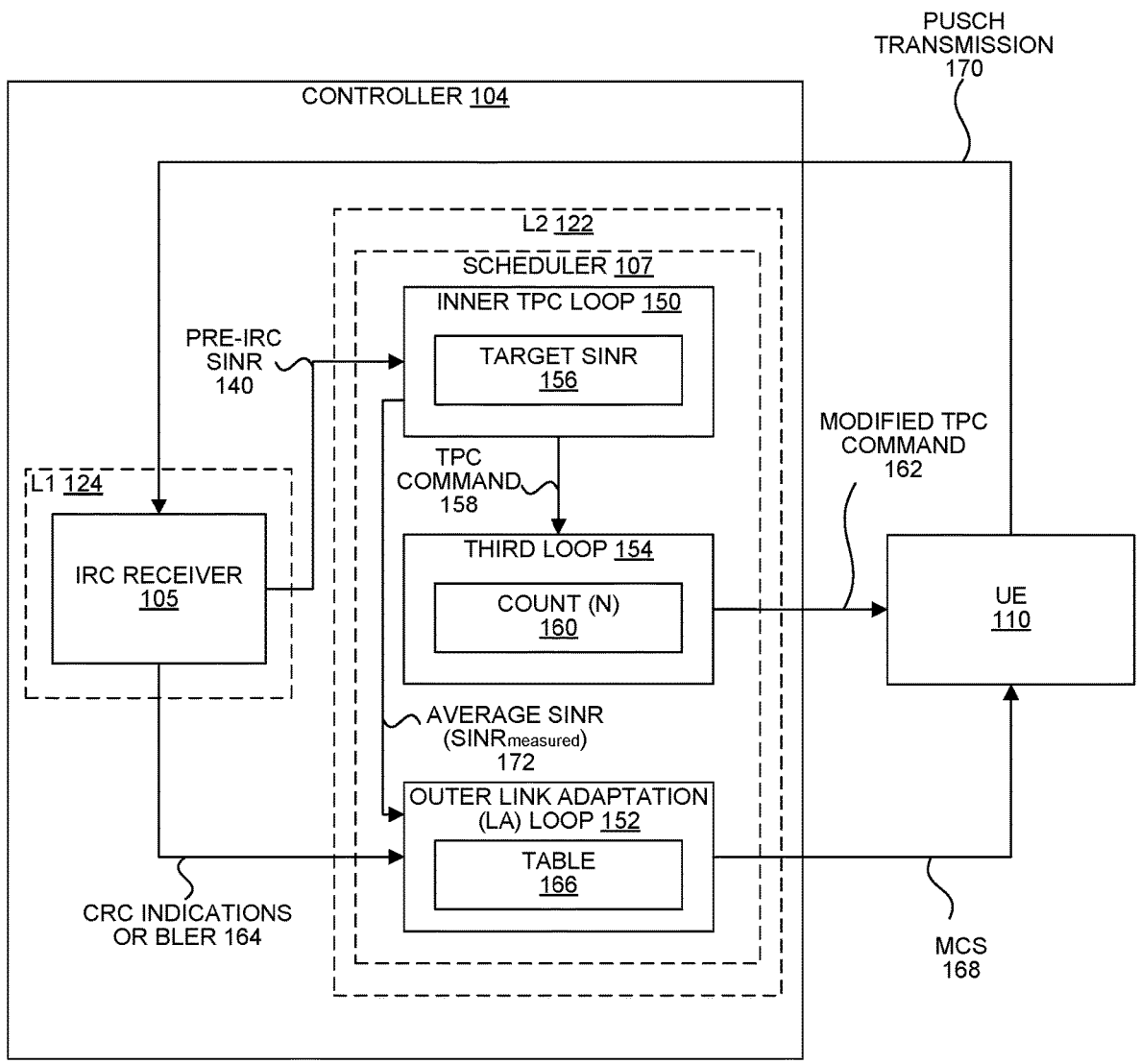
FIG. 5 is a block diagram illustrating example transmit power control based on a pre-IRC SINR and link adaptation (LA).

FIG. 5 is a block diagram illustrating example transmit power control based on a pre-IRC SINR 140 and link adaptation (LA). The transmit power control may be implemented, at least partially, by a controller 104 that includes L1 functionality 124 and L2 functionality 122. The L1 functionality 124 may include an IRC receiver 105, which operates as described above. The L2 functionality 122 may include a scheduler 107 with an inner TPC loop 150, an outer LA loop 152, and a third loop 154 (or TPCcapture-of-Excess-IRCGain loop), which operate as described above.

Specifically, the IRC receiver 105 may receive PUSCH transmissions 170 from a UE 110 and determine a pre-IRC SINR 140 for the UE 110. In some configurations, the pre-IRC SINR 140 is obtained by Maximal Ratio Combining (MRC) of multiple pre-IRC SINRs 140, across the $N_{RxAnt}$ receive antennas 108, across a measurement interval, e.g., each determined from a respective pre-IRC signal power 134 and pre-IRC noise plus interference power 138 measurement per receive antenna 108.

The inner TPC loop 150 will determine a TPC command 158 (e.g., TPC UP, TPC DOWN, or TPC UNCH) based on the average of pre-IRC SINR 140 ($SINR_{measured}$) and a target SINR 156 (e.g., 16 dB).

The outer LA loop 152 will determine an MCS 168 for the UE 110 based on the post-IRC SINR, estimated as the sum of the current average SINR ($SINR_{measured}$) 172 for the UE 110 reported by the inner TPC loop 150, e.g., using the average SINR ($SINR_{measured}$) 172 for the UE 110 and the cumulative delta_ack/nack (from the CRC indications or BLER 164), maintained internally by the outer LA loop 152, as an index in a predetermined table 166. In some configurations, the average SINR ($SINR_{measured}$) 172 is measured from multiple PUSCH transmissions from the UE 110 over a measurement interval. Alternatively, the average SINR ($SINR_{measured}$) 172 is measured from a single uplink transmission from the UE 110. The outer LA loop will update the cumulative delta_ack/nack more often (e.g., every TTI) than the inner TPC loop (e.g., once every 10-300 TTIs).

The third loop may selectively modify the TPC command 158 from the inner TPC loop 150 based on a count (N) 160 of consecutively received PUSCH transmissions 170 (from the UE 110) that meet at least one criteria. The count (N) may be incremented for each consecutive PUSCH transmission (from the UE 110) that meets the at least one criteria and reset if the most recent PUSCH reception does not meet the at least one criteria. The third loop 154 may determine a modified TPC command 162 that is sent to the UE 110.

When N1≤N<N2, the third loop 154 may prevent TPC UP commands and send only TPC UNCH or TPC DOWN as the modified TPC command 162. When N2≤N, the third loop 154 may send only TPC DOWN commands as the modified TPC command 162, e.g., regardless of the TPC command 158 from the inner TPC loop 150. When N<N1, the third loop 154 may leave the TPC command 158 from the inner TPC loop 150 unchanged, e.g., the TPC command 158 is used directly as the modified TPC command 162.

Pseudo-Code for TPC Using Pre-IRC SINR

A more specific example is now described with reference to the pseudo-code below. However, it is understood that the specific targets and other values for SINR, MCS, and BLER are merely exemplary and should not be construed as limiting.

The inner TPC loop 150 and the outer LA loop 152 may operate as described above.

Let t∈{−1,0,1} dB denote the prospective TPC command 158 for {DOWN, UNCH, UP}. The third loop 154 may selectively modify/replace t with t', where:

```
if (N1≤N<N2)
    t' = Min{0,t}
else if (N2≤N)
    t' = −1
else
    t' = t
```

In the "if" condition, TPC UP commands are inhibited, e.g., when at least a minimal number (N1) of 1st transmissions with MCS=MCS_max have succeeded for the at least the same number of most recent consecutive PUSCH receptions. In LTE configurations, MCS_max may be 23 or 28.

In the "else if" condition, TPC DOWN commands are forced, e.g., when a large number (at least N2) of first transmissions with MCS=MCS_max have succeeded for the same number of most recent consecutive PUSCH receptions.

In the "else" condition, the TPC command unchanged from inner TPC loop 150, e.g., when less than the minimal number (N1) of 1st transmissions with MCS=MCS_max have succeeded for the at least the same number of most recent consecutive PUSCH receptions.

In this example, the count (N) 160 may be incremented for each consecutive PUSCH transmissions received, starting with the most recent reception, which meets the following criteria: (1) is a first transmission from the UE 110 (e.g., not a retransmission); (2) is sent using a maximum MCS that can be supported for a target BLER (MCS=MCS_max); and (3) passes a cyclic redundancy check (CRC) in the controller 104.

Different criteria, more criteria, or less criteria may be used. For example, in some configurations, a fourth criteria may additionally be used to prevent a modified TPC Command (TPC DOWN) from reducing the post-IRC SINR to a level less than that capable of supporting MCS_max, after eventually accounting for all the possible IRC gain This fourth criteria requires, in order to increment (N) 160, that the average of pre-IRC SINR 140 (provided by inner Transmit Power Control (TPC) loop 150) plus a cumulative delta (e.g., delta_ack/nack accumulated based on CRC Indications or BLER by LA loop) is greater than or equal to an SINR threshold. The average pre-IRC SINR 140 ($SINR_{measured}$) plus cumulative delta_ack/nack is the outer LA loop 152 estimate of the post-IRC SINR.

The count (N) 160 may be incremented until a received PUSCH transmission doesn't meet at least one of the at least one (e.g., 3 or four) criteria being applied. N1 and N2 may be configurable with default values of 5 and 15, respectively. Relatively larger values of N2 result in a relatively smaller BLER<10%, but have slower TPC capture of excess IRC gain, i.e., slower convergence.

In this example, suppose that a pre-IRC SINR=8 dB is determined by the IRC receiver 105 in the presence of an interferer (e.g., other UEs 110, transmitting on the same PRBs, connected to the same C-RAN 100, connected to a macro BS or other small cell). Also suppose that for this pre-IRC SINR 140 (8 dB), the outer LA loop 152 will choose (and L2 122 will assign) MCS=10, e.g., because MCS=10 can be received with low CRC failure indications or BLER 164 (e.g., less than 10%) at the pre-IRC SINR 140 of 8 dB.

Depending on how much interference can be rejected during IRC, the gain can be sufficient to produce SINR of 16 dB post-IRC. In this case, the count (N) 160 is assigned 0 since MCS !=23, i.e., criteria (2) is not satisfied. So, the "else" condition (N<N1) in pseudo code above is executed and the TPC command 158 (TPC UP) from the inner TPC loop 150 is used as the modified TPC command 162 that is sent to the UE 110.

This continues until pre-IRC SINR 140 measured reaches the target SINR 156 of 16 dB. At that point, MCS=23 is assigned by L2 122. Thereafter, if the first uplink PUSCH transmissions 170 pass CRC, then the count (N) 160 is incremented. After N2 successive MCS=23 uplink PUSCH transmissions 170 pass CRC, which means that current average SINR for MCS=23 is good, the "else if (N2≤N)" condition may be invoked by the third loop 154. In the "else if (N2≤N)" condition, the modified TPC command 162 is a TPC DOWN command that is sent to reduce the UE 110 transmit power. Thereafter, if the CRC of PUSCH transmissions 170 continues to pass, the count (N) 160 continues to increment as well as force TPC DOWN to the UE 110.

At some point, a CRC fail (NACK) will be encountered by L2 122 resulting in the count (N) 160 being reset to zero, after which the unmodified inner TPC loop 150 will be invoked via the "else" condition, and a TPC UP command sent to the UE 110 in response. This should result in a CRC pass and subsequent MCS=23 assignment as normal inner TPC loop 150 would have done. Accordingly, the UE 110 will achieve the optimum minimum transmit power required for MCS=23 reception in the presence of IRC gain, without transmitting any hotter than necessary.

The point where a CRC fail (NACK) eventually is encountered is the point at which the full IRC gain possible has been recovered. At this point, as per the fourth criteria, the post-IRC SINR, which is equal to the average pre-IRC SINR+cumulative delta, becomes lesser than the SINR threshold. Consequently, resulting in the count (N) 160 being reset to zero, after which the unmodified inner TPC loop 150 will be invoked via the "else" condition, and a TPC UP command sent to UE 110 in response. This will result in a CRC pass of the MCS=MCS_max assignment. Accordingly, the UE 110 will achieve the optimum minimum transmit power required for MCS=MCS_max reception in the presence of IRC gain, without transmitting any hotter than necessary.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. For example, where a computing device is described as performing an action, the computing device may carry out this action using at least one processor executing instructions stored on at least one memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Terminology

Brief definitions of terms, abbreviations, and phrases used throughout this application are given below.

The term "determining" and its variants may include calculating, extracting, generating, computing, processing, deriving, modeling, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms may refer to direct or indirect connections. If the specification states a component or feature "may," "can," "could," or "might" be included or have a characteristic, that particular component or feature is not required to be included or have the characteristic.

The terms "responsive" or "in response to" may indicate that an action is performed completely or partially in response to another action. The term "module" refers to a functional component implemented in software, hardware, or firmware (or any combination thereof) component.

The methods disclosed herein comprise one or more steps or actions for achieving the described method. Unless a specific order of steps or actions is required for proper operation of the method that is being described, the order and/or use of specific steps and/or actions may be modified without departing from the scope of the claims.

In conclusion, the present disclosure provides novel systems, methods, and arrangements for transmit power control in a C-RAN. While detailed descriptions of one or more configurations of the disclosure have been given above, various alternatives, modifications, and equivalents will be apparent to those skilled in the art without varying from the spirit of the disclosure. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

EXAMPLE EMBODIMENTS

Example 1 includes a communication system, comprising: at least one radio point, each configured to exchange radio frequency (RF) signals with a user equipment (UE) at a site; and a controller communicatively coupled to the at least one radio point, wherein the controller is configured to: determine a transmit power control (TPC) command for the UE based on a signal to interference plus noise (SINR) for the UE; determine a count (N) of consecutive uplink transmissions, from the UE, meeting at least one criteria; and determine a modified TPC command for the UE based on the count (N) and the TPC command.

Example 2 includes the communication system of Example 1, wherein the SINR is a pre-Interference Rejection Combining (IRC) SINR for the UE.

Example 3 includes the communication system of any of Examples 1-2, wherein the SINR is a pre-Minimum Mean Square Equalization (MMSE) SINR for the UE.

Example 4 includes the communication system of any of Examples 2-3, wherein the controller is further configured to determine the pre-IRC SINR before IRC is performed at the controller.

Example 5 includes the communication system of any of Examples 1-4, wherein the controller is further configured to send the modified TPC command to the UE.

Example 6 includes the communication system of any of Examples 1-5, wherein the uplink transmissions comprise Physical Uplink Shared Channel (PUSCH) transmissions or Physical Uplink Control Channel (PUCCH) transmissions.

Example 7 includes the communication system of any of Examples 1-6, wherein, when the count (N) is greater than or equal to a first threshold (N1) and less than a second threshold (N2), the modified TPC command is a TPC unchanged command or a TPC down command, but not a TPC up command.

Example 8 includes the communication system of any of Examples 1-7, wherein, when the count (N) is greater than a second threshold (N2), the modified TPC command is a TPC down command.

Example 9 includes the communication system of any of Examples 1-8, wherein, when the count (N) is less than a first threshold (N1), the modified TPC command is the same as the TPC command.

Example 10 includes the communication system of any of Examples 1-9, wherein the controller is further configured to increment the count (N) in response to a particular uplink transmission only if the particular transmission meets the following criteria: the particular uplink transmission is a first transmission from the UE; the particular uplink transmission was sent using a maximum modulation and coding scheme (MCS) that can be supported for a target block error rate (BLER); and the particular uplink transmission passes a cyclic redundancy check (CRC) performed at the controller.

Example 11 includes the communication system of Example 10, wherein the controller is further configured to reset the count (N) in response to the particular uplink transmission not meeting at least one of the criteria.

Example 12 includes the communication system of any of Examples 2-11, wherein the controller is further configured to increment the count (N) in response to a particular uplink transmission only if the particular transmission meets the following criteria: the particular uplink transmission is a first transmission from the UE; the particular uplink transmission was sent using a maximum modulation and coding scheme (MCS) that can be supported for a target block error rate (BLER); the particular uplink transmission passes a CRC performed at the controller; and an average pre-IRC SINK, associated with the particular uplink transmission and provided by an inner TPC loop, plus a cumulative delta provided by an outer LA loop is greater than or equal to an SINR threshold.

Example 13 includes the communication system of Example 12, wherein the controller is further configured to reset the count (N) in response to the particular uplink transmission not meeting at least one of the criteria.

Example 14 includes the communication system of any of Examples 2-13, wherein the controller is further configured to determine an MCS for the UE, using an outer LA loop, based on an average SINR ($SINR_{measured}$) associated with the UE plus a cumulative delta maintained internally by an outer LA loop, wherein the average SINR ($SINR_{measured}$) is determined based on multiple pre-IRC SINRs across multiple antennas.

Example 15 includes the communication system of any of Examples 2-14, wherein the controller is further configured to determine the TPC command, using an inner TPC loop, based on an average SINR ($SINR_{measured}$) associated with the UE, wherein the average SINR ($SINR_{measured}$) is determined based on multiple pre-IRC SINRs across multiple antennas.

Example 16 includes the communication system of any of Examples 1-15, wherein receiving modified TPC commands causes the UE to transmit at an optimum lowest power sufficient to support full throughput at a maximum MCS in presence of interference.

Example 17 includes the communication system of Example 16, wherein the UE transmitting at the optimum lowest power reduces battery consumption in the UE compared to the UE transmitting based on receiving the TPC commands without modification.

Example 18 includes the communication system of any of Examples 16-17, wherein the UE transmitting at the optimum lowest power reduces interference for other UEs compared to the UE transmitting based on receiving the TPC commands without modification.

Example 19 includes the communication system of any of Examples 1-18, wherein receiving modified TPC commands causes the UE to transmit at an optimum lowest power sufficient to support full throughput at a maximum MCS, accounting for SINR measurement inaccuracies, in the absence of interference or low interference.

Example 20 includes the communication system of any of Examples 1-19, wherein the controller reuses IRC rejection components for PUSCH data symbols during transmit power control, resulting in controller processing cycle savings compared to not reusing IRC rejection components for PUSCH data symbols during transmit power control.

Example 21 includes a method for transmit power control in a communication system, the communication system comprising a controller and at least one radio point, wherein each radio point is configured to exchange radio frequency (RF) signals with a user equipment (UE) at a site, the method comprising: determining a transmit power control (TPC) command for the UE based on a signal to interference plus noise (SINR) for the UE; determining a count (N) of consecutive uplink transmissions, from the UE, meeting at least one criteria; and determining a modified TPC command for the UE based on the count (N) and the TPC command.

Example 22 includes the method of Example 21, wherein the SINR is a pre-Interference Rejection Combining (IRC) SINR for the UE.

Example 23 includes the method of any of Examples 21-22, wherein the SINR is a pre-Minimum Mean Square Equalization (MMSE) SINR for the UE.

Example 24 includes the method of any of Examples 22-23, further comprising determining the pre-IRC SINR before IRC is performed at the controller.

Example 25 includes the method of any of Examples 21-24, further comprising the modified TPC command to the UE.

Example 26 includes the method of any of Examples 21-25, wherein the uplink transmissions comprise Physical Uplink Shared Channel (PUSCH) transmissions or Physical Uplink Control Channel (PUCCH) transmissions.

Example 27 includes the method of any of Examples 21-26, wherein, when the count (N) is greater than or equal to a first threshold (N1) and less than a second threshold (N2), the modified TPC command is a TPC unchanged command or a TPC down command, but not a TPC up command.

Example 28 includes the method of any of Examples 21-27, wherein, when the count (N) is greater than a second threshold (N2), the modified TPC command is a TPC down command.

Example 29 includes the method of any of Examples 21-28, wherein, when the count (N) is less than a first threshold (N1), the modified TPC command is the same as the TPC command.

Example 30 includes the method of any of Examples 21-29, further comprising incrementing the count (N) in response to a particular uplink transmission only if the particular transmission meets the following criteria: the particular uplink transmission is a first transmission from the UE; the particular uplink transmission was sent using a maximum modulation and coding scheme (MCS) that can be supported for a target block error rate (BLER); and the particular uplink transmission passes a cyclic redundancy check (CRC) performed at the controller.

Example 31 includes the method of Example 30, further comprising resetting the count (N) in response to the particular uplink transmission not meeting at least one of the criteria.

Example 32 includes the method of any of Examples 22-31, further comprising incrementing the count (N) in response to a particular uplink transmission only if the particular transmission meets the following criteria: the particular uplink transmission is a first transmission from the UE; the particular uplink transmission was sent using a maximum modulation and coding scheme (MCS) that can be supported for a target block error rate (BLER); the particular uplink transmission passes a CRC performed at the controller; and an average pre-IRC SINR, associated with the particular uplink transmission and provided by an inner TPC loop, plus a cumulative delta provided by an outer LA loop is greater than or equal to an SINR threshold.

Example 33 includes the method of Example 32, further comprising resetting the count (N) in response to the particular uplink transmission not meeting at least one of the criteria.

Example 34 includes the method of any of Examples 22-33, further comprising determining an MCS for the UE, using an outer LA loop, based on an average SINR ($SINR_{measured}$) associated with the UE plus a cumulative delta maintained internally by an outer LA loop, wherein the average SINR ($SINR_{measured}$) is determined based on multiple pre-IRC SINRs across multiple antennas.

Example 35 includes the method of any of Examples 22-34, further comprising determining the TPC command, using an inner TPC loop, based on an average SINR ($SINR_{measured}$) associated with the UE, wherein the average SINR ($SINR_{measured}$) is determined based on multiple pre-IRC SINRs across multiple antennas.

Example 36 includes the method of any of Examples 21-35, wherein receiving modified TPC commands causes the UE to transmit at an optimum lowest power sufficient to support full throughput at a maximum MCS in presence of interference.

Example 37 includes the method of Example 36, wherein the UE transmitting at the optimum lowest power reduces battery consumption in the UE compared to the UE transmitting based on receiving the TPC commands without modification.

Example 38 includes the method of any of Examples 36-37, wherein the UE transmitting at the optimum lowest power reduces interference for other UEs compared to the UE transmitting based on receiving the TPC commands without modification.

Example 39 includes the method of any of Examples 21-38, wherein receiving modified TPC commands causes the UE to transmit at an optimum lowest power sufficient to support full throughput at a maximum MCS, accounting for SINR measurement inaccuracies, in the absence of interference or low interference.

Example 40 includes the method of any of Examples 21-39, wherein IRC rejection components for PUSCH data symbols are reused during transmit power control, resulting in controller processing cycle savings compared to not reusing IRC rejection components for PUSCH data symbols during transmit power control.

The invention claimed is:

1. A communication system, comprising:
   at least one radio point, each configured to exchange radio frequency (RF) signals with a user equipment (UE) at a site; and
   a controller communicatively coupled to the at least one radio point, wherein the controller is configured to:
   determine a transmit power control (TPC) command for the UE based on a signal to interference plus noise (SINR) for the UE;
   determine a count (N) of consecutive uplink transmissions, from the UE, meeting at least one criteria; and
   determine a modified TPC command for the UE based on the count (N) and the TPC command.

2. The communication system of claim 1, wherein the SINR is a pre-Interference Rejection Combining (IRC) SINR for the UE.

3. The communication system of claim 2, wherein the controller is further configured to determine the pre-IRC SINR before IRC is performed at the controller.

4. The communication system of claim 2, wherein the controller is further configured to increment the count (N) in response to a particular uplink transmission only if the particular transmission meets the following criteria:
- the particular uplink transmission is a first transmission from the UE;
- the particular uplink transmission was sent using a maximum modulation and coding scheme (MCS) that can be supported for a target block error rate (BLER);
- the particular uplink transmission passes a CRC performed at the controller; and
- an average pre-IRC SINR, associated with the particular uplink transmission and provided by an inner TPC loop, plus a cumulative delta provided by an outer LA loop is greater than or equal to an SINR threshold.

5. The communication system of claim 4, wherein the controller is further configured to reset the count (N) in response to the particular uplink transmission not meeting at least one of the criteria.

6. The communication system of claim 2, wherein the controller is further configured to determine an MCS for the UE, using an outer LA loop, based on an average SINR ($SINR_{measured}$) associated with the UE plus a cumulative delta maintained internally by the outer LA loop, wherein the average SINR ($SINR_{measured}$) is determined based on multiple pre-IRC SINRs across multiple antennas.

7. The communication system of claim 2, wherein the controller is further configured to determine the TPC command, using an inner TPC loop, based on an average SINR ($SINR_{measured}$) associated with the UE, wherein the average SINR ($SINR_{measured}$) is determined based on multiple pre-IRC SINRs across multiple antennas.

8. The communication system of claim 1, wherein the SINR is a pre-Minimum Mean Square Equalization (MMSE) SINR for the UE.

9. The communication system of claim 1, wherein the controller is further configured to send the modified TPC command to the UE.

10. The communication system of claim 1, wherein the uplink transmissions comprise Physical Uplink Shared Channel (PUSCH) transmissions or Physical Uplink Control Channel (PUCCH) transmissions.

11. The communication system of claim 1, wherein, when the count (N) is greater than or equal to a first threshold (N1) and less than a second threshold (N2), the modified TPC command is a TPC unchanged command or a TPC down command, but not a TPC up command.

12. The communication system of claim 1, wherein, when the count (N) is greater than a second threshold (N2), the modified TPC command is a TPC down command.

13. The communication system of claim 1, wherein, when the count (N) is less than a first threshold (N1), the modified TPC command is the same as the TPC command.

14. The communication system of claim 1, wherein the controller is further configured to increment the count (N) in response to a particular uplink transmission only if the particular transmission meets the following criteria:
- the particular uplink transmission is a first transmission from the UE;
- the particular uplink transmission was sent using a maximum modulation and coding scheme (MCS) that can be supported for a target block error rate (BLER); and
- the particular uplink transmission passes a cyclic redundancy check (CRC) performed at the controller.

15. The communication system of claim 14, wherein the controller is further configured to reset the count (N) in response to the particular uplink transmission not meeting at least one of the criteria.

16. The communication system of claim 1, wherein receiving modified TPC commands causes the UE to transmit at an optimum lowest power sufficient to support full throughput at a maximum MCS in presence of interference.

17. The communication system of claim 16, wherein the UE transmitting at the optimum lowest power reduces battery consumption in the UE compared to the UE transmitting based on receiving the TPC commands without modification.

18. The communication system of claim 16, wherein the UE transmitting at the optimum lowest power reduces interference for other UEs compared to the UE transmitting based on receiving the TPC commands without modification.

19. The communication system of claim 1, wherein receiving modified TPC commands causes the UE to transmit at an optimum lowest power sufficient to support full throughput at a maximum MCS, accounting for SINR measurement inaccuracies, in the absence of interference or low interference.

20. The communication system of claim 1, wherein the controller reuses IRC rejection components for PUSCH data symbols during transmit power control, resulting in controller processing cycle savings compared to not reusing IRC rejection components for PUSCH data symbols during transmit power control.

21. The communication system of claim 1, wherein the controller is physically separated from the at least one radio point.

22. A method for transmit power control in a communication system, the communication system comprising a controller and at least one radio point, wherein each radio point is configured to exchange radio frequency (RF) signals with a user equipment (UE) at a site, the method being performed by the controller, the method comprising:
- determining a transmit power control (TPC) command for the UE based on a signal to interference plus noise (SINR) for the UE;
- determining a count (N) of consecutive uplink transmissions, from the UE, meeting at least one criteria; and
- determining a modified TPC command for the UE based on the count (N) and the TPC command.

23. The method of claim 22, wherein the SINR is a pre-Interference Rejection Combining (IRC) SINR for the UE.

24. The method of claim 23, further comprising determining the pre-IRC SINR before IRC is performed at the controller.

25. The method of claim 23, further comprising incrementing the count (N) in response to a particular uplink transmission only if the particular transmission meets the following criteria:
- the particular uplink transmission is a first transmission from the UE;
- the particular uplink transmission was sent using a maximum modulation and coding scheme (MCS) that can be supported for a target block error rate (BLER);
- the particular uplink transmission passes a CRC performed at the controller; and
- an average pre-IRC SINR, associated with the particular uplink transmission and provided by an inner TPC loop, plus a cumulative delta provided by an outer LA loop is greater than or equal to an SINR threshold.

26. The method of claim 25, further comprising resetting the count (N) in response to the particular uplink transmission not meeting at least one of the criteria.

27. The method of claim 23, further comprising determining an MCS for the UE, using an outer LA loop, based on an average SINR ($SINR_{measured}$) associated with the UE plus a cumulative delta maintained internally by the outer LA loop, wherein the average SINR ($SINR_{measured}$) is determined based on multiple pre-IRC SINRs across multiple antennas.

28. The method of claim 23, further comprising determining the TPC command, using an inner TPC loop, based on an average SINR ($SINR_{measured}$) associated with the UE, wherein the average SINR ($SINR_{measured}$) is determined based on multiple pre-IRC SINRs across multiple antennas.

29. The method of claim 22, wherein the SINR is a pre-Minimum Mean Square Equalization (MMSE) SINR for the UE.

30. The method of claim 22, further comprising the modified TPC command to the UE.

31. The method of claim 22, wherein the uplink transmissions comprise Physical Uplink Shared Channel (PUSCH) transmissions or Physical Uplink Control Channel (PUCCH) transmissions.

32. The method of claim 22, wherein, when the count (N) is greater than or equal to a first threshold (N1) and less than a second threshold (N2), the modified TPC command is a TPC unchanged command or a TPC down command, but not a TPC up command.

33. The method of claim 22, wherein, when the count (N) is greater than a second threshold (N2), the modified TPC command is a TPC down command.

34. The method of claim 22, wherein, when the count (N) is less than a first threshold (N1), the modified TPC command is the same as the TPC command.

35. The method of claim 22, further comprising incrementing the count (N) in response to a particular uplink transmission only if the particular transmission meets the following criteria:
the particular uplink transmission is a first transmission from the UE;
the particular uplink transmission was sent using a maximum modulation and coding scheme (MCS) that can be supported for a target block error rate (BLER); and
the particular uplink transmission passes a cyclic redundancy check (CRC) performed at the controller.

36. The method of claim 35, further comprising resetting the count (N) in response to the particular uplink transmission not meeting at least one of the criteria.

37. The method of claim 22, wherein receiving modified TPC commands causes the UE to transmit at an optimum lowest power sufficient to support full throughput at a maximum MCS in presence of interference.

38. The method of claim 37, wherein the UE transmitting at the optimum lowest power reduces battery consumption in the UE compared to the UE transmitting based on receiving the TPC commands without modification.

39. The method of claim 37, wherein the UE transmitting at the optimum lowest power reduces interference for other UEs compared to the UE transmitting based on receiving the TPC commands without modification.

40. The method of claim 22, wherein receiving modified TPC commands causes the UE to transmit at an optimum lowest power sufficient to support full throughput at a maximum MCS, accounting for SINR measurement inaccuracies, in the absence of interference or low interference.

41. The method of claim 22, wherein IRC rejection components for PUSCH data symbols are reused during transmit power control, resulting in controller processing cycle savings compared to not reusing IRC rejection components for PUSCH data symbols during transmit power control.

* * * * *